United States Patent [19]

Treatch

[11] Patent Number: 5,898,382
[45] Date of Patent: Apr. 27, 1999

[54] SHARED CHANNEL COMMUNICATION SYSTEM

[76] Inventor: James E. Treatch, 4312 E. Brooktree La., Dallas, Tex. 75287

[21] Appl. No.: 08/798,805

[22] Filed: Feb. 12, 1997

[51] Int. Cl.$^6$ .............................. H01H 67/00; H04Q 7/00
[52] U.S. Cl. .................. 340/825.03; 370/334; 455/447; 455/452; 455/562
[58] Field of Search .................. 340/825.03; 370/329, 370/334; 455/436, 445, 447, 450, 452, 561, 562

[56] References Cited

U.S. PATENT DOCUMENTS

| | | | |
|---|---|---|---|
| 4,128,740 | 12/1978 | Graziano | 455/477 |
| 4,730,310 | 3/1988 | Acampora et al. | 370/334 |
| 4,965,850 | 10/1990 | Schloemer | 455/450 |
| 5,125,102 | 6/1992 | Childress et al. | 370/329 |
| 5,134,709 | 7/1992 | Bi | 455/452 |
| 5,432,780 | 7/1995 | Smith et al. | 370/334 |
| 5,475,864 | 12/1995 | Hamabe | 455/452 |
| 5,621,786 | 4/1997 | Fischer et al. | 370/334 |
| 5,625,623 | 4/1997 | Kent et al. | 370/329 |
| 5,649,293 | 7/1997 | Reed | 455/447 |
| 5,697,057 | 12/1997 | Bursztejn | 455/447 |
| 5,778,317 | 7/1998 | Kaminsky | 455/447 |

*Primary Examiner*—Edwin C. Holloway, III
*Assistant Examiner*—Edward Merz
*Attorney, Agent, or Firm*—Paul F. Wille

[57] ABSTRACT

A communication system includes a scanning receiver coupled to a first antenna, a plurality of repeaters coupled to a second antenna, wherein each repeater operable on any channel in a band, and a computer coupled to each repeater for controlling the operation of each repeater and coupled to the scanning receiver for obtaining traffic information from the receiver and storing the information in memory. The memory also contains a table of channels and station IDs, wherein a station ID is associated with a particular channel. Each repeater operates on an available channel, as indicated by the traffic information, using the station ID associated with the channel. The repeaters themselves can be used for obtaining traffic information, eliminating the scanning receiver. The repeaters do not have final amplifiers. Instead, a low level combining circuit couples the signals from each repeater to a single linear amplifier.

12 Claims, 4 Drawing Sheets

SHARED CHANNEL COMMUNICATION SYSTEM

BACKGROUND OF THE INVENTION

This invention relates to a repeater system for enabling mobile or portable radio stations to communicate with each other and, in particular, to a communication system that increases usage of existing channels in a band without increasing conflicting requests or "collisions."

The frequency spectrum is like land, minerals, or fossil fuel, in that it is a finite resource. Meetings are held internationally to allocate portions of the spectrum among the many claimants. Various segments or bands of the frequency spectrum are dedicated to mobile communications, typically using a repeater. Other bands are allocated to federal, state, or local governments, amateur radio, and utilities, for example. Recently, the government of the United States discovered that auctioning licenses to operate in portions of the frequency spectrum was a spectacular source of revenue. Providers of cellular telephone and other communication services anxiously purchased as many site licenses and channels as possible, viewing the licenses as an investment. The view is reasonable because, once taken, there are no more channels available.

A repeater is a receiver-transmitter combination for receiving a signal at one frequency and simultaneously re-transmitting the same signal on a second frequency. Depending upon application, the transmitted frequency may be relatively close to the received frequency, e.g. 600 khz., or greatly displaced from the received signal. Depending upon application, frequency, and government regulation, the transmitter in a repeater may be relatively powerful, hundreds of watts, or may be rated at just a few watts.

Commercial two-way radio communication has evolved into two different techniques for mobile operation, cellular and specialized mobile radio (SMR) or dispatch service. Cellular systems use several repeaters dispersed in a geographic area and operating at low power to keep propagation relatively short, e.g. within a radius of less than ten miles. The local area covered by each repeater overlaps the local areas covered by neighboring repeaters, forming overlapping "cells" of coverage. A subscriber traveling from one cell to another cell is automatically switched from one repeater to another by a computer coupled to the repeaters by microwave link, optical fiber, or wire.

Because propagation is short, the frequencies used by one repeater can be used by a non-neighboring repeater without interference, thereby serving more subscribers in a given geographic area. Re-using assigned frequencies in a geographic area provides much more efficient use of the limited resource.

SMR uses a powerful repeater, usually located at the highest available elevation in a geographic area. The repeater is coupled to an omni-directional antenna to cover the entire geographic area, enabling dispatchers to communicate with a fleet of vehicles in the geographic area and enabling the vehicles to communicate with each other. U.S. application Ser. No. 498,510, filed Jul. 5, 1995, and owned by the owner of this invention, discloses a system for increasing use of an SMR repeater by defining a plurality of cells radially extending from the antenna.

Despite these techniques in the fields of cellular radio and SMR, the number of channels available will become less than the number needed for all potential users. Providing service even for current users requires a large number of repeaters, which are very expensive to install and to maintain. Part of the problem is that repeaters available today operate on a small number of frequencies and are designed to handle the maximum anticipated traffic. As such, many repeaters are often idle for long periods when traffic is light. The problem is compounded if a repeater is held in reserve to cover failures due to lightning or some other cause. This further increases the number of repeaters required and, by definition, the reserve repeater is idle.

In view of the foregoing, it is therefore an object of the invention to increase the utilization of existing mobile communication equipment.

A further object of the invention is to provide a communication system that makes more efficient use of allocated channels and transmission sites.

Another object of the invention is to provide a communication system that can serve more than one licensee.

A further object of the invention is to provide a system that enables small service providers to increase the number of subscribers that can be serviced.

Another object of the invention is to provide a repeater back-up function without requiring an additional repeater.

A further object of the invention is to increase usage of relatively idle channels in a communication service area.

SUMMARY OF THE INVENTION

The foregoing objects are achieved by this invention, in which the communication system includes a scanning receiver coupled to a first antenna, a plurality of repeaters coupled to a second antenna, wherein each repeater operable on any channel in a band, and a computer coupled to each repeater for controlling the operation of each repeater and coupled to the scanning receiver for obtaining traffic information from the receiver and storing the information in memory. The memory also contains a table of channels and station IDs, wherein a station ID is associated with a particular channel. Each repeater operates on an available channel, as indicated by the traffic information, using the station ID associated with the channel. The repeaters themselves can be used for obtaining traffic information, eliminating the scanning receiver. The repeaters do not have final amplifiers. Instead, a low level combining circuit couples the signals from each repeater to a single linear amplifier.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
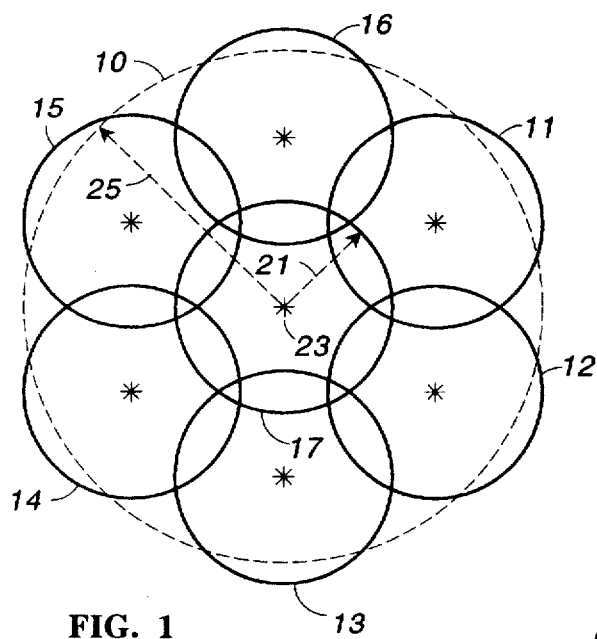
FIG. 1 illustrates the coverage provided by a cellular radio system.

FIG. 1 illustrates the coverage of geographic area 10 by a plurality of cellular repeaters. In particular, circles 11, 12, 13, 14, 15, 16, and 17 approximately cover the area indicated by circle 10 and represents the propagation distance, as indicated by radius 21, for a transmitter located at the center of a cell, such as transmitter 23 at the center of circle 17. In typical cellular telephone systems, radius 21 is equal to ten miles or less.

The number of cells and their placement are determined by the actual shape of the geographic area in which services is desired. Assuming a circular geographic area, as represented by circle 10, seven overlapping cells, each having a radius of about eight miles, could cover a geographic area having a radius of approximately twenty miles, as indicated by radius 25. A frequency or channel in use in one cell could not be used in an adjoining cell but could be used in a non-adjoining cell in the same area. For example, a channel in use in circle 16 could not be used in circle 17 but could be used in circles 12, 13, or 14. Thus, a large number of services can be served without interference.

Figure 2:
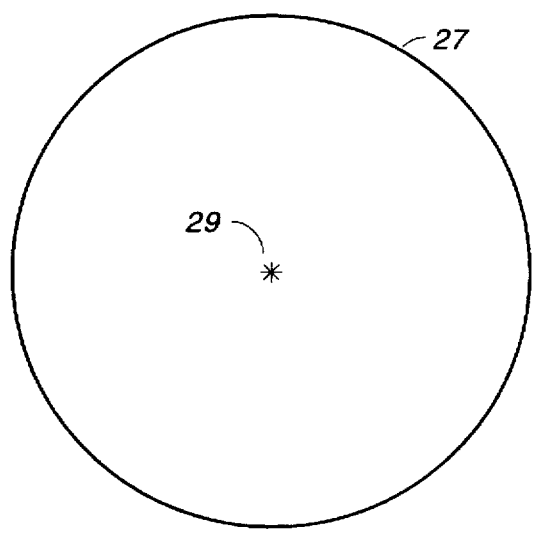
FIG. 2 illustrates the coverage provided by a specialized mobile radio system.

FIG. 2 illustrates the coverage provided by a specialized mobile radio system in which circle 27 indicates the geographic area served by transmitter 29 located at the center of circle 27. A single subscriber within geographic area 27 ties up the entire area each time the repeater at location 29 is accessed. Cellular repeaters (FIG. 1) typically operate on different subsets of the available channels and the repeaters are coupled to a control computer for assigning the subsets of frequencies. Each centrally located site, such as site 23, includes a plurality of repeaters, one for each service channel in the subset. The control computer also selects the channel within each subset.

Figure 3:
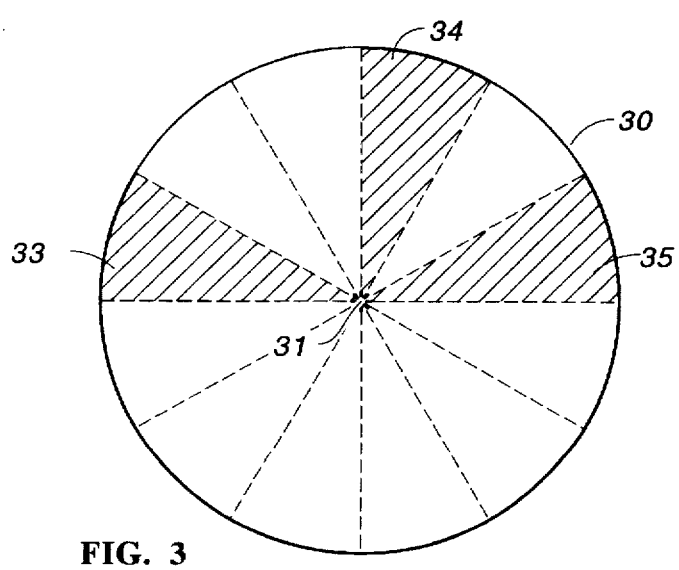
FIG. 3 illustrates the coverage provided by a modified specialized mobile radio system.

The above-identified copending application discloses dividing the area served by an SMR repeater into a plurality of radially extending cells, as illustrated in FIG. 3. Service area 30 around transmitter 31 is divided into a plurality of radially extending cells, such as cells 33, 34, and 35 by a scanning beam antenna (not shown in FIG. 3). As with a cellular system, non-adjoining cells may use the same frequency, thereby increasing the number of subscribers that can be served.

Figure 4:
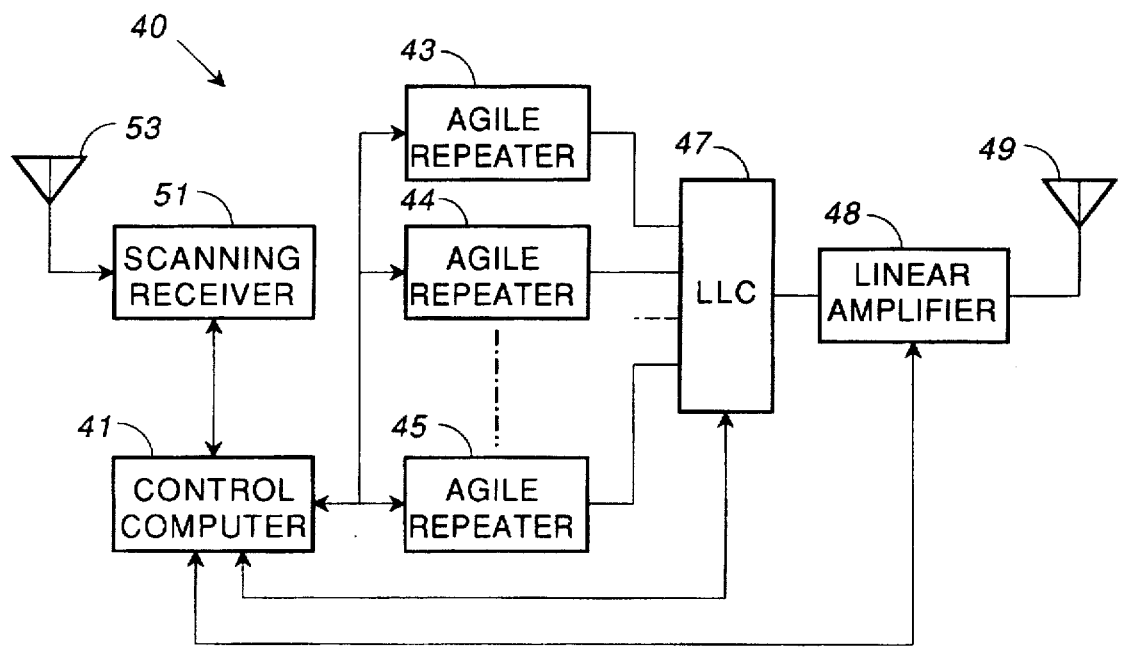
FIG. 4 illustrates a repeater system constructed in accordance with a preferred embodiment of the invention.

Spatially dividing a service area will increase the number of subscribers that can be served but the problem of a limited resource remains. The repeater system illustrated in FIG. 4 enables one to make even more efficient use of the available frequency spectrum. System 40 includes control computer 41 coupled to one or more frequency agile repeaters, such as repeaters 43, 44, and 45. A frequency agile repeater is a repeater that can be set to any channel in a band under remote control, wherein each channel includes a first frequency for transmission and a second frequency for reception offset from the first frequency by a fixed amount.

In the prior art, repeaters were configured to operate on a sub-set of the channels in a band. In accordance with one aspect of the invention, the repeaters operate anywhere in the band according to the appropriate license, i.e. the operation is broadband compared with the prior art. Control computer 41 coordinates the operation of repeaters 43, 44, and 45 to prevent conflicts between any of the repeaters.

In accordance with another aspect of the invention, computer 41 assures that there are no conflicts with other repeaters operating in the same propagation area. Receiver 51 is coupled to omni-directional antenna 53 and monitors activity in the propagation area, represented as circles 10 and 30 in FIGS. 1 and 3. Receiver 51 scans the channels for activity and provides data to computer 41 concerning transmissions in the area. This data enables computer 41 to perform two functions. A first function is preventing simultaneous use of a channel in the propagation area, i.e. collision avoidance. In accordance another aspect of the invention, a second function is to provide historical data from which channel assignments are made.

Figure 5:
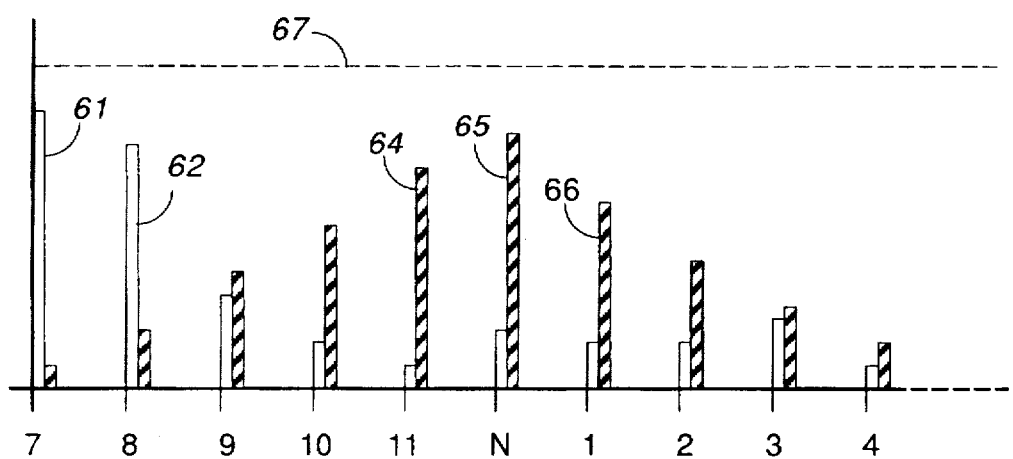
FIG. 5 is a histogram of band activity for two services and is useful in explaining the operation of the repeater system.

FIG. 5 is a histogram of channel activity by two services in a geographic area. This data is accumulated from scanning receiver 51 or is obtained by polling subscribers. The abscissa (x-axis) represents hours of the day, starting at 7 a.m. The ordinate (y-axis) represents the number of calls per hour. A first service has a large number of calls early in the day, as represented by open rectangles 61 and 62. A second service has a large number of calls in the middle of the day, as represented by the cross-hatched rectangles such as rectangles 64, 65 and 66.

Dotted line 67 represents the maximum number of repeaters of each service, which, for simplicity sake, is assumed to be the same number. Thus, line 67 also represents the maximum number of simultaneous calls that each service can provide. In accordance with the invention, each service could almost double the number of simultaneous calls or could reduce its investment in equipment by almost fifty percent.

For example, if a first service needed additional channels, the additional channels are borrowed from the second service, under the license (station identification (ID) or call sign) of the second service. Computer 41 (FIG. 4) provides the appropriate channel and station ID to each repeater and monitors usage. Periodically, e.g. weekly or monthly, each service is provided with an accounting of the number of calls handled on borrowed repeaters. Alternatively, and preferably, one service simply rents the channels from another for a fixed monthly fee regardless of the number of calls.

Regardless of how the accounting is accomplished, a minimum number of repeaters is reserved for unexpected traffic. For example, if the second service has, on average, three simultaneous calls between 7 a.m. and 8 a.m. and is licensed for five channels, then the first service can borrow at least one channel during that time period, leaving one channel in reserve. In this way, for example, a municipality can lease its unused channels with the assurance that the channels are available when needed. For some services, e.g. ambulance, one can provide that the system will simply drop a call if a channel in use is required by the ambulance service.

Computer 41 dynamically assigns channels depending upon traffic. If the second service has no calls at a given time, then all but one of the second service's channels can be used by another service. If the second service receives a call on the one remaining channel, then the next channel to clear is put in reserve as soon as it clears. Thus, a system constructed in accordance with the invention eliminates the need for a repeater to be held in reserve. If a repeater becomes inoperative, the owner can buy time from another service and fix the defective repeater at his leisure without interrupting service. At present, one must go to the repeater site and repair the repeater as soon as possible because customers are without service. During a severe electrical storm, going to the repeater site could be undesirable.

The outputs of repeaters 43, 44 and 45 are coupled through low level combining circuit 47 to linear amplifier 48. Both circuit 47 and linear amplifier 48 are controlled by computer 41, which selects the repeater and the power level for each transmission. Antenna 49 radiates the signal from amplifier 48.

In the prior art, each repeater includes a power amplifier and several such repeaters share an antenna. In accordance with the invention, a single linear amplifier serves several repeaters, thereby reducing the cost of each repeater and permitting one to use low level combining, thereby further reducing cost and reducing noise in the system. The linear amplifier must be very linear, characterized by intermodulation distortion of minus 60–80 dbc. (decibels below carrier). Although such amplifiers are more expensive than the power amplifier in a typical repeater, which is typically characterized by intermodulation distortion of minus 40 dbc., the increase in cost is more than offset by the fact that there is only one power amplifier. "Low level combining" refers to the manipulation of signals having a power of less than approximately one watt.

Figures 6, 7:
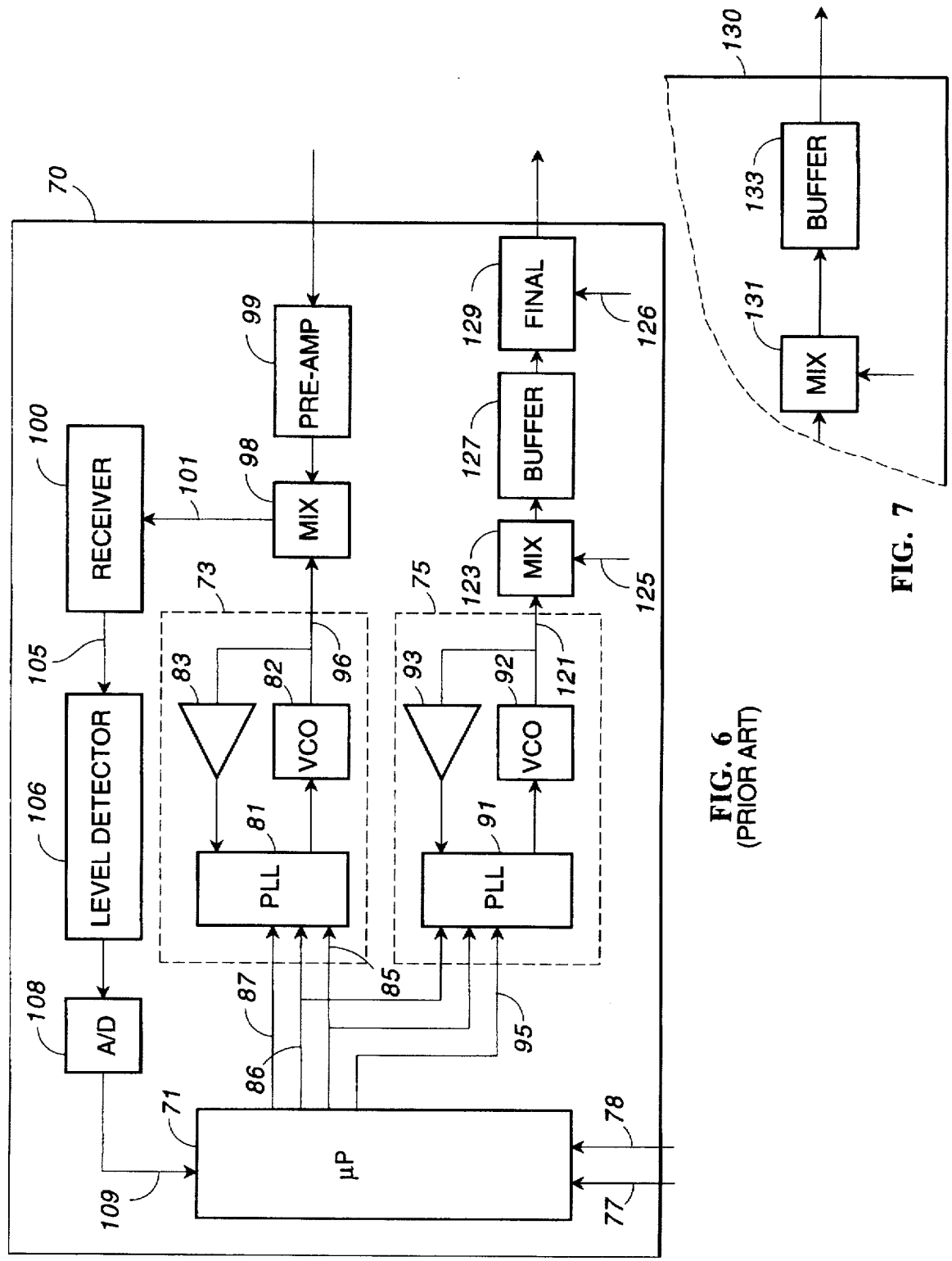
FIG. 6 is a block diagram of a typical SMR repeater of the prior art.
FIG. 7 is a partial block diagram of an SMR repeater modified in accordance with one aspect of the invention.

In FIG. 6, repeater 70 includes microprocessor 71 coupled to frequency synthesizer 73 and to frequency synthesizer 75. Synthesizer 73 controls the received frequency of the repeater and synthesizer 75 determines the transmitted frequency of the repeater. The transmitted frequency is offset from the received frequency by a predetermined amount, depending upon the band being used. For example, in the 800 megahertz band, the transmission frequency is 45 megahertz above the received frequency.

Receive synthesizer 73 includes phased lock loop circuit 81, voltage controlled oscillator 82, and amplifier 83. Microprocessor 71 controls the frequency at which the loop locks by way of data line 85, clock line 86 and receive enable line 87. Similarly, transmit synthesizer 75 includes phase lock loop 91, voltage controlled oscillator 92, and amplifier 93. Synthesizer 75 is controlled by data line 85, clock line 86 and transmission enable line 95.

Output 96 from synthesizer 73 is coupled as one input to mixer 98. A second input to mixer 98 is coupled to pre-amp 99, which is coupled to antenna array 115 and which includes suitable filters, amplifiers, and impedance matching networks. Output 101 from mixer 98 is coupled to receiver 100 for further amplification, filtering, and detection. Either voice or data or both voice and data can be transmitted and received.

Line 77 is a serial data line, such as an RS232 line, for transferring data between microprocessor 71 and a control computer (not shown). Other repeaters at the same site are also coupled to the control computer by a serial links. Input line 78 is a repeater network data link between the control computer and each of the repeaters at the site. The control computer, in turn, is coupled to telephone lines for controlling the site remotely.

A voltage indicative of signal strength (the average amplitude of a received signal) is provided by receiver 100 on line 105 to level detector 106. In its simplest form, level detector 106 is a capacitor for smoothing the voltage indicative of signal strength. Other circuits, e.g. threshold sensing circuits, can be included in level detector 106. The output from level detector 106 is converted into a digital signal by A/D converter 108. The output of A/D converter is coupled to input 109 of microprocessor 71. The amplitude information is coupled by microprocessor 71 to the control computer for steering the beam in antenna array 115 by way of beam switch circuitry 116. For example, repeater 70 tracks a vehicle moving from one cell to another by monitoring the amplitude of the received signal and briefly switching the beam position to determine if the signal level decreases or increases, thereby selecting the appropriate azimuth for the beam to maintain contact with a subscriber.

The output from frequency synthesizer 75 is coupled by line 121 to one input of mixer 123. Input 125 to mixer 123 is coupled to a stable local oscillator for producing an appropriate frequency. Buffer 127 couples the output signal to final amplifier 129, which includes an amplifier, filter, and matching network (not shown). Final amplifier 129 includes gain control input 126, which can be coupled to microprocessor 71 or to a control computer for adjusting the output power of repeater 70.

In accordance with the invention, a repeater is modified as shown in FIG. 7 by eliminating the final amplifier. In repeater 130, mixer 131 is coupled to buffer 133. There is no final amplifier. The output from buffer 133 is coupled as one input to low level combining circuit 47 (FIG. 4), wherein signals from repeaters 43 and 44 through 45 are combined and are coupled to linear amplifier 48.

Figure 8:
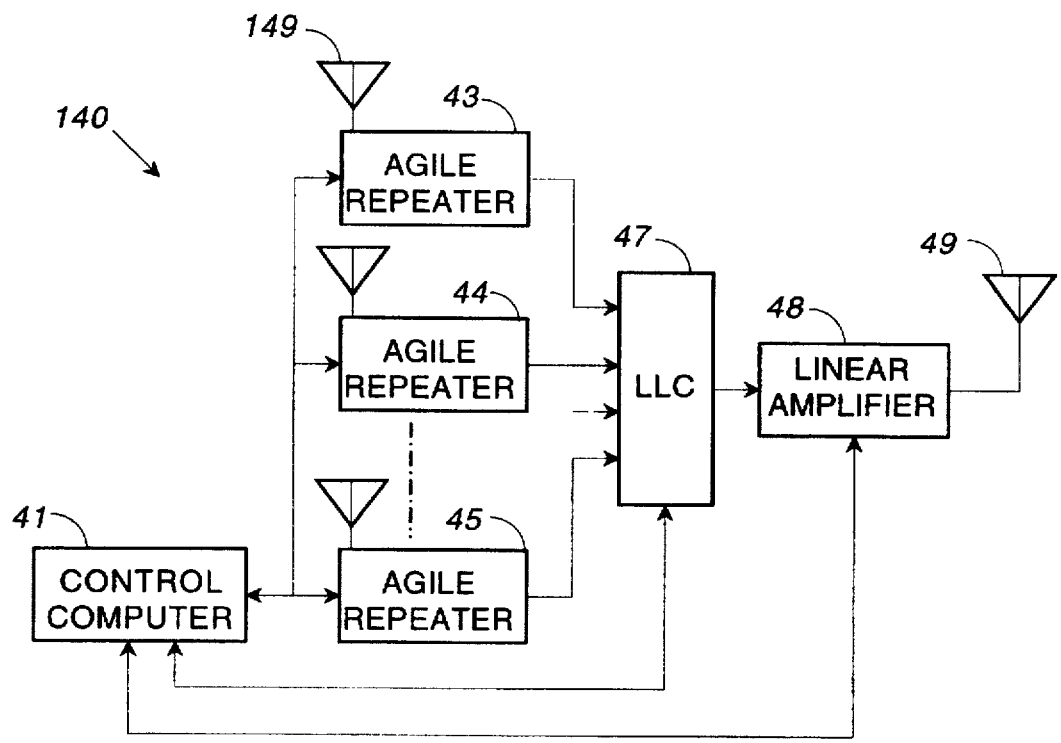
FIG. 8 illustrates a repeater system constructed in accordance with an alternative embodiment of the invention.

FIG. 8 illustrates a communication system constructed in accordance with an alternative embodiment of the invention. System 140 differs from system 40 (FIG. 4) in that there is no scanning receiver and each repeater is coupled to a receiving antenna. System 140 includes control computer 41 and frequency agile repeaters 43 and 44 through 45. The outputs from the repeaters are coupled to the inputs of low level combining circuit 47 and the output of circuit 47 is coupled to linear amplifier 48. Amplifier 48 is coupled to antenna 49, which can be an omni-directional antenna or, preferably, an antenna producing a rotatable beam. Repeater 43 is coupled to receiving antenna 149 and the other repeaters are connected either to antenna 149 or to individual antennas, as shown. If all repeaters are coupled to antenna 149, then a multi-coupler or splitter is used to divide the signal among the repeaters and to isolate the repeaters.

Figure 9:
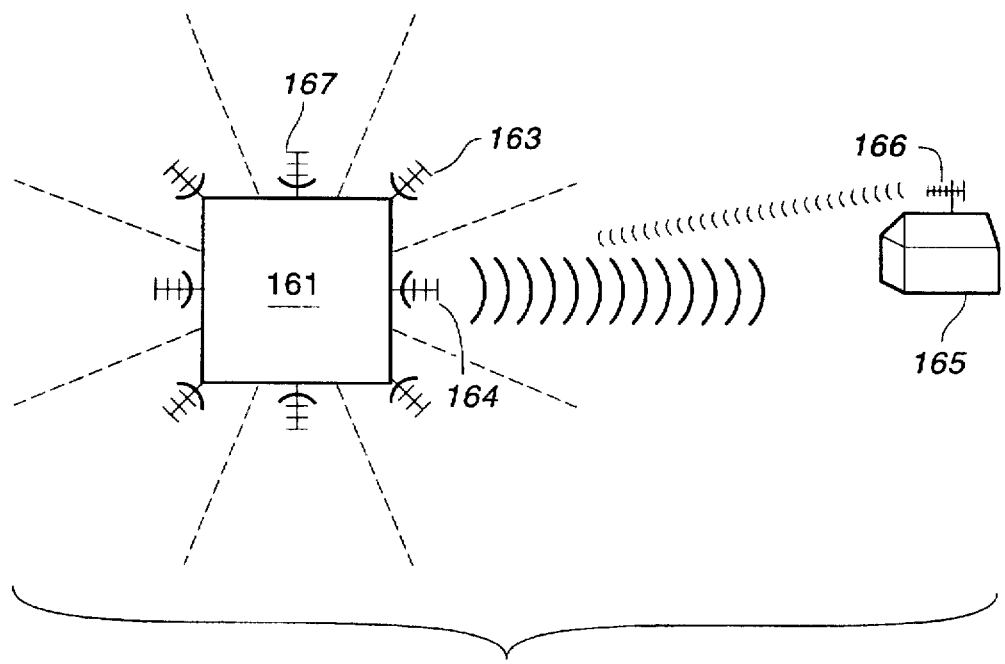
FIG. 9 illustrates an embodiment of the invention for communications among fixed stations.

In operation, the individual repeaters provide traffic information to control computer 41, providing the function of a scanning receiver but without the expense. Computer 41 controls the frequency of each repeater in accordance with the traffic in a service area to avoid collisions. Computer 41, in turn, can be controlled remotely by a telephone link or by a RS232 or other serial data link. Although one can use the communication system illustrated in FIG. 8 for mobile service, one can also provide a local radiotelephone operation among fixed locations, as illustrated in FIG. 9. In a radiotelephone system, a sub-audible signalling format or AMPS signalling format is used for dialing and the repeater site acts as a central station.

In FIG. 9, building 161 includes eight twenty channel repeaters, each coupled to an antenna such as antenna 163 or antenna 164. Each antenna includes a corner reflector for high front to back ratio and further uses the building 20, 0 for shielding. Each antenna covers a 45° segment, preferably with a 60° beam to provide a 15° overlap at each boundary. A corner reflector antenna typically has 30 db. attenuation at 90° and 40 db. attenuation at 180°. Each house or other customer location, such as house 165, includes an antenna, such as antenna 166 illustrated as a yagi antenna, which has reasonable gain, directivity, and cost.

Antennas 163 and 164 will not be operating on the same channels but antennas 164 and 167, in alternate segments, could be operating on the same channel. It is therefore preferred that the transmitter/antenna combination of each customer produce a signal that is no more than 10–20 db. above that necessary for full quieting in the repeaters. There are commercially available transceivers whose return power can be controlled by a repeater. Absent such transceivers, the transmitter/antenna combination would have to be adjusted at each customer's location to assure that there is no interference with non-adjacent segments. At 10–20 db. above full quieting, each customer produces a signal that is more than ample yet not enough for interference.

With eight antennas, each channel can be used four times. With twenty channels per antenna and twenty-five subscribers per channel, the system illustrated in FIG. 9 can provide full duplex communications for two thousand customers. Even more customers can be served by borrowing channels from other licensees. This is a considerable advantage over known SMR systems that provide simplex operation for one customer at a time and is a very efficient use of the frequency spectrum.

The invention thus increases the utilization of existing mobile communication equipment and makes more efficient use of allocated channels and transmission sites by increasing usage of relatively idle channels in a service area. A communication system constructed in accordance with the invention can serve more than one licensee and enables small service providers to increase the number of subscribers that can be serviced. A communication system constructed in accordance with the invention also provides a repeater back-up function without requiring an additional repeater.

Having thus described the invention, it will be apparent to those of skill in the art that various modifications can be made within the scope of the invention. For example, receiver 51 (FIG. 4) can be coupled to one or more beam antennas for monitoring activity in a propagation area. Although described in the context of a fixed repeater site, the repeater site could be mobile for providing a wireless emergency communication system that can be effected in a very short time and moved as needed to optimize location or to avoid damage.

What is claimed as the invention is:

1. A communication system for providing two-way communications in a predetermined propagation area, said system comprising:
    a first antenna;
    a scanning receiver coupled to said first antenna;
    a second antenna;
    at least one repeater coupled to said second antenna, said repeater operable on any one of a plurality of channels;
    a computer coupled to said repeater for controlling the channel of operation of said repeater and coupled to said scanning receiver for obtaining traffic information from said receiver and storing the information, said computer including memory containing a table of channels and station IDs, wherein a station ID is associated with a particular channel; and
    wherein said computer causes said repeater to operate on an available channel, as indicated by said traffic information, using the station ID associated with the channel.

2. The communication system as set forth in claim 1 and further including a plurality of repeaters coupled to said second antenna and to said computer, wherein said computer coordinates the operation of said plurality of repeaters in accordance with said traffic information.

3. The communication system as set forth in claim 2 wherein none of said repeaters include a final amplifier and wherein said communication system further includes a linear amplifier coupled to said second antenna and a low level combining circuit coupling said repeaters to said linear amplifier.

4. A communication system for providing two-way communications in a predetermined propagation area, said system comprising:
    a receiving antenna;
    a first repeater coupled to said receiving antenna, said first repeater operable on any channel in a band;
    a second repeater operable on any channel in said band;
    a computer coupled to the repeaters for controlling the channels of operation of the repeaters and for obtaining traffic information from at least said first repeater and for storing the traffic information, said computer including a memory containing a table of channels and station IDs, wherein a station ID is associated with a particular channel; and
    wherein said computer causes each repeater to operate on an available channel, as indicated by said traffic information, using the station ID associated with the channel.

5. The communication system as set forth in claim 4 wherein neither said first repeater nor said second repeater includes a final amplifier and wherein said communication system further includes a linear amplifier and a low level combining circuit coupling said repeaters to said linear amplifier.

6. The communication system as set forth in claim 5 wherein said linear amplifier is characterized by intermodulation distortion lower than −40 dbc.

7. The communication system as set forth in claim 5 wherein said second repeater is coupled to said receiving antenna and said computer obtains traffic information from said first repeater and said second repeater.

8. The communication system as set forth in claim 5 wherein said second repeater is coupled to a second receiving antenna and said computer obtains traffic information from said first repeater and said second repeater.

9. A communication system for providing two-way communications in a predetermined propagation area, said system comprising:
    a plurality of antennas defining radially distributed segments of propagation;
    a plurality of repeaters coupled one each to said antennas, said repeaters operable on any channel in a band;
    a computer coupled to the repeaters for controlling the channels of operation of the repeaters, said computer obtaining traffic information from at least some of said repeaters and storing the traffic information, said computer including a memory containing a table of channels and station IDs, wherein a station ID is associated with a particular channel; and
    wherein said computer causes each repeater to operate on an available channel, as indicated by said traffic information, using the station ID associated with the channel.

10. The communication system as set forth in claim 9 and further including a plurality of transceivers located remote from said antennas, wherein the return power of each tranceivers is limited to 10 db to 20 db above full quieting in said repeaters.

11. The communication system as set forth in claim 9 wherein said plurality of antennas includes corner reflectors.

12. The communication system as set forth in claim 9 wherein said computer re-uses channels in alternate segments of propagation.

* * * * *